United States Patent

Uchiyama et al.

[11] Patent Number: 5,973,765
[45] Date of Patent: *Oct. 26, 1999

[54] METHOD OF AND DEVICE FOR SELECTIVELY PRINTING ONE OF AN IMAGE FORMED ON A PHOTOGRAPHIC FILM AND LIQUID CRYSTAL DISPLAY PANEL

[75] Inventors: Kaoru Uchiyama; Toshio Itoh; Eiichi Kito; Toshiyuki Hiroishi, all of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/592,489

[22] Filed: Jan. 26, 1996

[30] Foreign Application Priority Data

Feb. 23, 1995 [JP] Japan .................. 7-035306

[51] Int. Cl.⁶ .................................. G03B 27/52
[52] U.S. Cl. .................................. 355/40
[58] Field of Search .................. 355/18, 32, 39, 355/40

[56] References Cited

U.S. PATENT DOCUMENTS

| | | | |
|---|---|---|---|
| 3,673,933 | 7/1972 | Hamann | 355/43 X |
| 4,903,068 | 2/1990 | Shiota | 355/40 X |
| 4,924,258 | 5/1990 | Tsutsui | 355/75 X |
| 4,963,919 | 10/1990 | Matsumoto et al. | 355/40 |
| 5,138,368 | 8/1992 | Kahn et al. | 355/53 |
| 5,414,490 | 5/1995 | Kurokawa et al. | 355/71 |
| 5,424,802 | 6/1995 | Saita | 355/71 X |
| 5,432,580 | 7/1995 | Tokuda | 355/77 X |

FOREIGN PATENT DOCUMENTS 61-122639 6/1986 Japan .................. G03B 27/32

*Primary Examiner*—Fred L. Braun
*Attorney, Agent, or Firm*—Sughrue, Mion, Zinn, Macpeak & Seas, PLLC

[57] ABSTRACT

A method and an apparatus for printing images on different mediums, such as images recorded on a photographic film and index print images onto photographic paper while an image printing device is reduced in size. A film carrier is positioned to a first position so that images recorded on a negative film set on the film carrier are exposed by a light source. Further, the film carrier is moved to a second position so that images formed on a liquid crystal panel are exposed by the same light source as that used for the exposure of the images on the negative film.

24 Claims, 5 Drawing Sheets

METHOD OF AND DEVICE FOR SELECTIVELY PRINTING ONE OF AN IMAGE FORMED ON A PHOTOGRAPHIC FILM AND LIQUID CRYSTAL DISPLAY PANEL

BACKGROUND OF THE INVENTION

1. Field of the Invention

The present invention relates to a method of and a device for printing images, and more specifically to a method of and a device for printing images, in which light emitted from a light source is transmitted through an image placed on a printing optical path so as to print the image onto a photographic paper.

2. Description of the Related Art

Index prints formed by arranging respective frames in matrix form and printing them on a scale-down basis have heretofore been known so that an easy check can be made as to which pictures would be photographed on a single developed film (see Japanese Patent Application Laid-Open No. 61-122638, for example).

Further, the present applicant has proposed a photographic printer capable of forming photographic prints and the above index prints within the same case to provide an easy check and printing images for the index prints without reducing the performance for processing the photographic prints at high speed.

This type of photographic printer includes a photosensitive material conveying unit which provides index print areas between each case of photographic paper (corresponding to each film, for example) including printed images, and an index print unit for printing/exposing images (index images) for index prints onto the index print areas.

In the photographic printer referred to above, the index images are displayed on a color CRT and the displayed images are focused through a printing lens onto a photosensitive material, thereby printing/exposing the index images thereon.

It is however necessary to additionally provide an index print stage in order to incorporate the index prints into a normal print step. It is difficult to install this index print stage in a location where only a restricted space can be ensured as in the case where films are processed at a shop such as a mini-laboratory or the like in particular.

As a related art, a system has been proposed wherein the index print images (corresponding to images obtained by reading a plurality of images recorded on a film as digital images and arranging them in matrix form) are formed on a liquid crystal panel composed of a plurality of pixels capable of displaying the images in plural tones respectively and the displayed images are printed.

SUMMARY OF THE INVENTION

With the foregoing in view, it is therefore an object of the present invention to provide a method of and a device for printing images on different mediums such as index print images and normal size images recorded on a photographic film onto photographic paper under the common use of a printing optical path while the device is reduced in size.

According to a first aspect of the present invention, for achieving the above object, there is provided a method of printing images, in which light emitted from a light source is transmitted through an image placed on a printing optical path so as to print the image onto a photographic paper, comprising selectively placing one of an image recorded on a photographic film and an image formed on a liquid crystal panel at a predetermined position on the printing optical path.

Further, according to a second aspect of the present invention, there is provided a method of printing images, in which light emitted from a light source is transmitted through images placed on printing optical paths so as to print the images onto a photographic paper, which comprises the steps of transmitting light emitted from a first light source through an image recorded on a photographic film in a first printing optical path, transmitting light emitted from a second light source through an image formed on a liquid crystal panel in a second printing optical path, and selectively directing one of the image transmitted through the first printing optical path and the image transmitted through the second printing optical path to the photographic paper by means of a reflecting mirror, thereby printing the images onto the photographic paper.

Furthermore, according to a third aspect of the present invention, there is provided a device for printing images, in which light emitted from a light source is transmitted through an image placed on a printing optical path so as to print the image onto a photographic paper, which comprises a film carrier capable of conveying image frames on the photographic film along a film guide path and holding a peripheral portion of each image frame positioned to the position of a mask aperture, a liquid crystal panel provided in the film carrier and mounted to an aperture provided at a position away from the mask aperture, and a member for positioning the film carrier to one of a first position where the mask aperture is placed on the printing optical path and a second position where the liquid crystal panel is placed on the printing optical path.

According to the method of the first aspect of the present invention, since the images on the photographic film or the liquid crystal panel can be respectively selectively placed in the predetermined position on the printing optical path, the images on the photographic film or the images on the liquid crystal panel can be printed by commonly using the printing optical path without providing an alternative printing optical path. It is therefore possible to reduce an image printing device in size.

If, in this case, exposure conditions between the images recorded on the photographic film and the images formed on the liquid crystal panel are changed, then the images on the different mediums can be properly printed.

If an additive color exposure is effected on the images formed on the liquid crystal panel and a subtractive color exposure is effected on the images recorded on the photographic film, then the images on the different mediums, such as normal size images and index print images can be both printed as distinct prints.

According to the method of the second aspect of the present invention, the images transmitted through the first printing optical path or the images transmitted through the second printing optical path are selectively directed to the photographic paper by means of a reflecting mirror, thereby printing the images onto the photographic paper. Therefore, the images can be printed onto the photographic paper under the common use of the printing optical path adjacent to the photographic paper. It is thus possible to reduce an image printing device in size. Since the light sources are individually provided, the images can be both printed clearly by individually setting proper exposure conditions.

According to the image printing device of the third aspect of the present invention, the present device includes the film carrier, the liquid crystal panel on the film carrier, and the member for positioning the film carrier to one of the first position where the mask aperture of the film carrier is placed on the printing optical path and the second position where the liquid crystal panel is placed on the printing optical path. Therefore, the switching between the images placed on the printing optical path is performed according to the positioning of the same film carrier to the first or second position, whereby the images can be printed using the same light source. Thus, the entire device can be reduced in size and the images recorded on the photographic film or the images formed on the liquid crystal panel can be easily printed.

If, in this case, the positioning member is composed of the driver for driving the film carrier, the at least one sensor for detecting that the film carrier has reached the first and second positions, and the controller for controlling the driving of the driver based on the signal outputted from the sensor, then the film carrier can be automatically positioned.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 6 is a schematic view showing another aspect of the second embodiment.

DETAILED DESCRIPTION OF THE PREFERRED EMBODIMENTS

[First embodiment]

Figure 1:
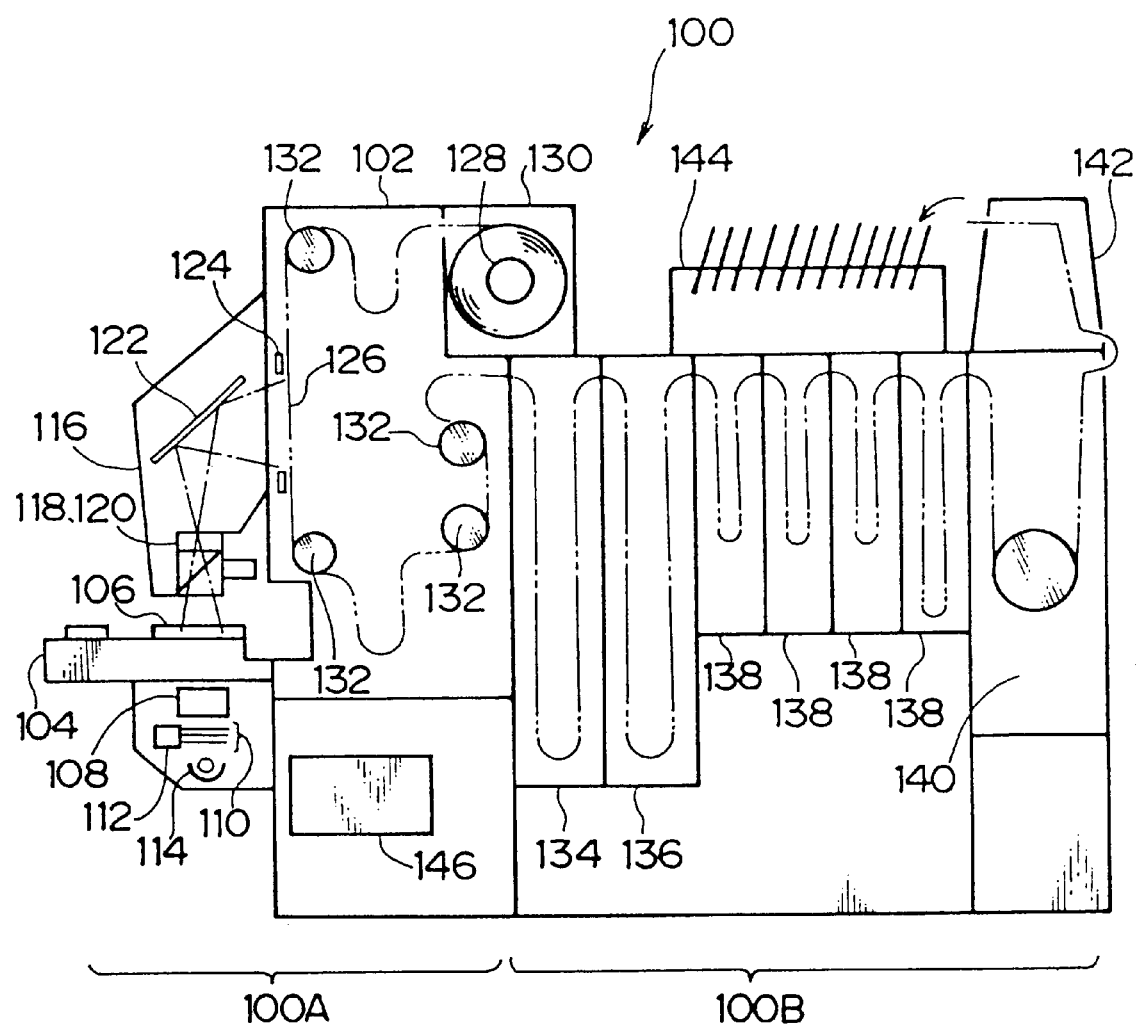
FIG. 1 is a view schematically showing the structure of a photographic printer according to a first embodiment of the present invention.

Preferred embodiments of the present invention will hereinafter be described with reference to the accompanying drawings. FIG. 1 shows a photographic printer to which the present invention is applied.

As shown in FIG. 1, the photographic printer 100 includes a casing 102 covering the outside thereof and a working table 104 which is provided on the printer portion 100A side as seen in the left direction of FIG. 1 and projects from the casing 102. The working table 104 is provided as a region for an image exposure portion. A film carrier 106 on which a photographic negative film 208 and a liquid crystal panel 212 (see FIG. 2) to be described later are set, is placed on an upper surface of the working table 104.

A diffusion barrel 108, a filter 110, a driver 112 and a light source 114 are provided below the working table 104 as seen in FIG. 1.

A printing lens 118 and a black shutter 120 are disposed within an optical portion 116 located above the working table 104 as seen in FIG. 1. The black shutter 120 is opened and closed in response to a drive signal supplied from an unillustrated driver such that light passes on a printing optical path therethrough or such that the light is cut off. The printing lens 118 is movable along an optical axis L of the printing optical path so that an enlargement magnification can be changed. When the switching between the printing of images on the photographic film 208 and the printing of images displayed on the liquid crystal panel 212 is performed, the printing lens 118 is moved along the optical axis L of the printing optical path so that their enlargement magnifications are adjusted to perform proper printing.

The light transmitted through the photographic film 208 passes through the printing lens 118 and is deflected by a reflecting mirror 122 (the optical axis is deflected about 90 degrees). A variable print mask 124 is provided on the side of the reflecting mirror 122.

A paper magazine 130 for supporting roll-shaped photographic paper 126 by a support shaft 128 and holding it therein is mounted on an upper surface of the casing 102.

A plurality of rollers 132 are provided within the casing 102. The photographic paper 126 hangs down on the side of the reflecting mirror 122 so that images on the photographic film 208 are printed thereon.

The photographic paper 126 with the images printed thereon is conveyed to a color development bath 134 of a processor portion 100B. The color development bath 134 immerses the photographic paper 126 into a developer so as to effect development processing thereof.

The photographic paper 126 subjected to the development processing is conveyed to a bleaching/fixing bath 136 provided adjacent to the color development bath 134. The bleaching/fixing bath 136 immerses the photographic paper 126 into a fixing liquid so as to subject it to fixing processing.

The photographic paper 126, which has been subjected to the fixing process, is conveyed to a plurality of rinse baths 138 for immersing the photographic paper 126 into washing water so as to subject it to a washing process.

The photographic paper 126, which has been subjected to the washing process, is conveyed to a drying unit 140 provided adjacent to the rinse baths 138. The drying unit 140 applies hot air to the photographic paper 126 so as to subject it to drying processing.

The photographic paper 126, which has been subjected to the drying process, is conveyed to a cutter unit 142 disposed on the upper side of the drying unit 140. The cutter unit 142 cuts the photographic paper 126 at each image frame. The cut photographic papers 126 are discharged to the outside of the casing 102 of the photographic printer 100.

The cut and discharged photographic papers 126 are sorted into a sorter 144 as finished prints for each photographic film.

An image processor 146 is provided on a lower surface of the casing 102 as seen in FIG. 1. The image processor 146 reads image data of respective frame, which have been recorded on a negative film and stores them therein. Further, the image processor 146 sets a proper exposure correction value and sends it to an unillustrated controller where the exposure is corrected. Furthermore, the image processor 146 is connected to an unillustrated liquid crystal panel driver connected to the film carrier 106 so that the image data stored therein can be displayed on the liquid crystal panel 212 on the film carrier 106.

Figure 2:
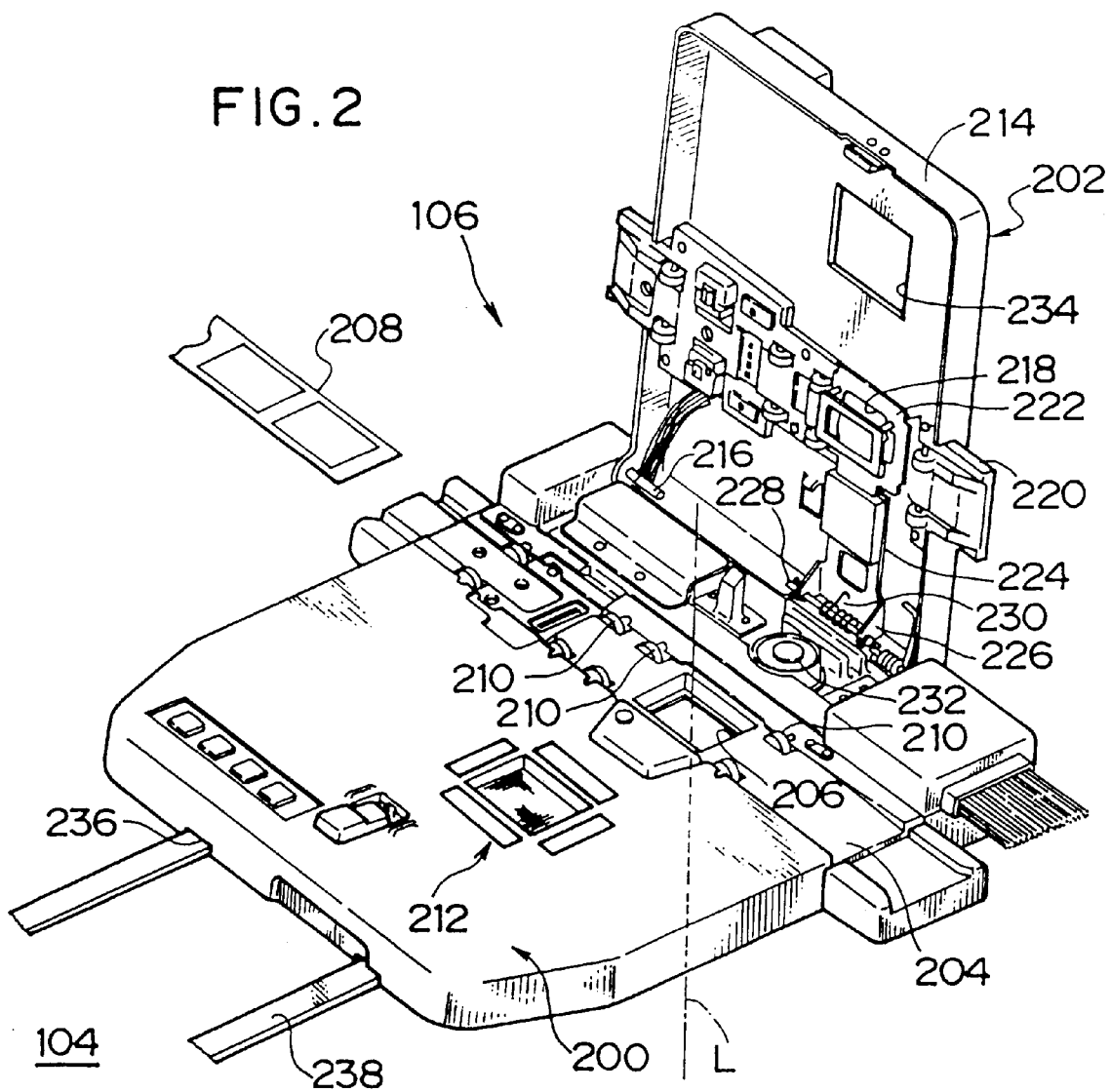
FIG. 2 is a perspective view illustrating a film carrier of the photographic printer shown in FIG. 1.

FIG. 2 shows the film carrier 106. The film carrier 106 is composed principally of a support 200 used as a base and an opening/closing cover 202 used as a cover body.

The base 200 has a negative film conveying path 204 defined therein as a guide path. An exposure opening or aperture 206 is defined in a longitudinally-extending central Portion of the negative film conveying path 204 so as to serve as a port for applying light emitted from the light source 114 mounted in the photographic printer 100 therethrough.

The exposure aperture 206 is identical in size to each of the image frames on the negative film 208. The negative film conveying path 204 includes a plurality of conveying rollers 210 provided on the upstream and downstream sides (in the left and right directions as seen in FIG. 2) so as to correspond to the back (undersurface) of the negative film 208. The conveying rollers 210 are respectively driven in the same direction of rotation and at the same rotational speed.

Further, the base 200 includes the liquid crystal panel 212 vertically aligned side by side with the exposure aperture 208. When the film carrier 106 is displaced in the direction normal to the conveying direction of the negative film 208 guided and conveyed along the negative film conveying path 204, the liquid crystal panel 212 is placed on the optical axis L of the printing optical path.

The opening/closing cover 202 has a lower end of a housing-shaped cover body 214 thereof, which is supported by a bar 216 fixed to the base 200. The opening/closing cover 202 can be opened and closed about the bar 216 so as to correspond to the base 200.

A through-hole 218 is defined in the cover body 214 so as to correspond to the exposure aperture 206. An upper guide base 220 is attached to the cover body 214 at a position where it corresponds to the negative film conveying path 204 in a state in which the cover body 214 is closed.

An upper mask 222 used as a negative film holding means, which is movable relative to the upper guide base 220 and has an opening or aperture provided at a position where it corresponds to the through-hole 218, is situated in the central portion of the upper guide base 220 in the conveying direction of the negative film 208, and is attached to a mask base 224.

A bracket 226 is provided at a basal end of the mask base 224. The bracket 226 is supported by a bar 228 mounted to the base 200 and the mask base 224 is urged in a cover opening direction by a torsion spring 230. Further, the mask base 224 is provided so as to correspond to a solenoid 232 mounted on the base 200 in a closed state of the cover body 214. Thus, when the solenoid 232 is electrically energized, the mask base 224 is attracted to the solenoid 232 side by its magnetic force so that the upper mask 222 is brought into intimate contact with the exposure aperture 206 of the negative film conveying path 204 against an urging force of the torsion spring 230, thereby holding the negative film 208 placed in the optical axis L therebetween.

A through-hole 234 is defined in the cover body 214 so as to correspond to the liquid crystal panel 212. The through-hole 234 is substantially identical in size to the liquid crystal panel 212 or slightly larger in size than the liquid crystal panel 212. The through-hole 234 is provided so that exposure light for the liquid crystal panel 212 can pass through the film carrier 106 without being cut off.

Grooves 236 are defined in the back of the base 200 of the film carrier 106 so as to meet at right angles to the film conveying direction. On the other hand, a pair of rails 238 used as slide members is provided on the working table 104. Parts of the pair of rails 238 are accommodated within their corresponding grooves 236. Thus, the film carrier 106 is guided along the rails 238 so as to be able to move in the direction orthogonal to the film conveying direction.

Now, the film carrier 106 is normally positioned at a first position where the negative film 208 is fixed onto the negative film conveying path 204 and can be exposed to the light emitted from the light source 114 through the exposure aperture 206. Further, by sliding the film carrier 106 along the pair of rails 238 disposed on the working table 104 so as to move to the right as seen in FIG. 1 along the direction orthogonal to the film conveying direction, the film carrier 106 is positioned to a second position where the liquid crystal panel 212 can be exposed to the light emitted from the light source 114.

When the film carrier 106 is manually moved, the positioning of the file carrier 106 may be done by restricting the movement of the film carrier by the length of each rail 238, namely, by providing projections or the like at both ends of the rails 238 and bringing the film carrier 106 into contact with the projections. When the film carrier 106 is slid by a drive unit such as a motor or the like, a sensor may be placed in a predetermined position of each rail 238 so as to detect the position of the film carrier 106 and thereby position the film carrier 106 under the deactivation of the motor.

Figure 3:
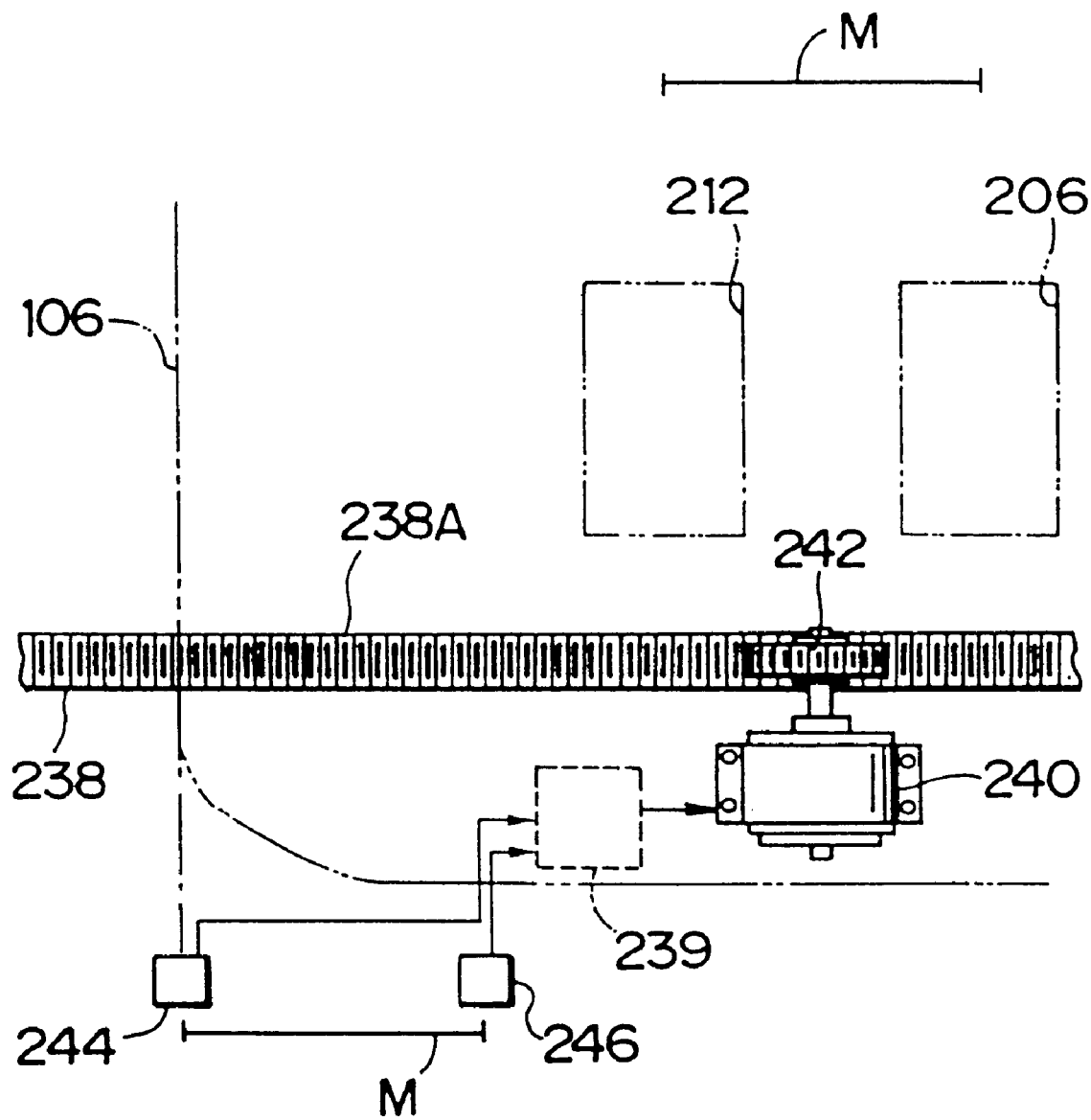
FIG. 3 is a conceptual view showing a driving unit of the film carrier shown in FIG. 2.

As one example of a structure for automatically driving the film carrier 106, a structure can be applied wherein a motor 240 controllable by a controller 239 is mounted on the film carrier 106 and a toothed wheel 242 whose outer part projects to the back of the base 200, is attached to a rotatable shaft of the motor 240 so as to mesh with a rack portion 238A provided in a transversely-extending central portion of one (corresponding to the toothed wheel 242) of the pair of rails 238 as shown in FIG. 3.

Thus, the film carrier 106 can be slid along the rails 238 by rotating the motor 240 in a reciprocal direction. In this case, the film carrier 106 can be automatically positioned to the first and second positions by situating sensors 244 and 246 in positions corresponding to the first and second positions and controlling the driving of the motor 240 by the controller 239 based on signals detected by the sensors 244 and 246.

Figure 4:
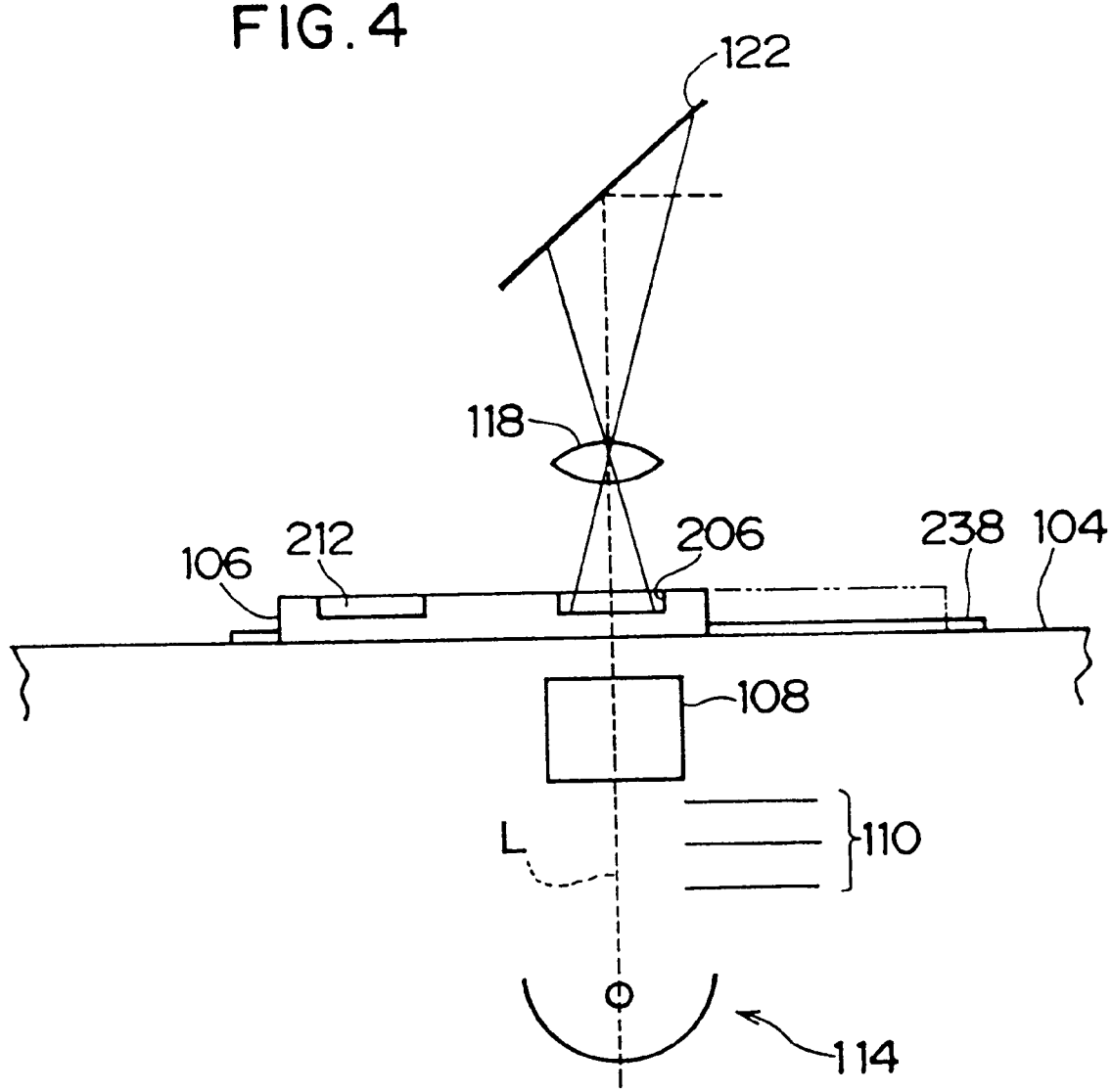
FIG. 4 is a schematic view illustrating the photographic printer shown in FIG. 1.

As shown in FIG. 4, the images on the negative film 208 set on the film carrier 106 can be exposed to the light emitted from the light source 114 by positioning the film carrier 106 to a position (the first position) indicated by a solid line in FIG. 4 under the manual or automatic operation. Further, the images formed on the liquid crystal panel 212 can be exposed to the light transmitted along the printing optical path of the same light source 114 as that employed in the exposure of the negative film 208 by displacing the film carrier 106 to a position (the second position) indicated by an imaginary line in FIG. 4.

The operation of the present embodiment will now be described. The description of the operation will be made in accordance with a procedure for subjecting images recorded on a single negative film 208 to exposure for index printing each time a process for exposing the single negative film 208 to light is finished.

The negative film 208 is first set on the film carrier 106 and the film carrier 106 is then positioned at the first position.

When the positioning of the film carrier 106 is finished, the negative film 208 is conveyed onto the film conveying path 204 so that an initial image frame is positioned to a printing position and subjected to exposure. When the exposure of the initial image frame is finished, the negative film 208 is conveyed so as to position the next image frame (frame-by-frame advance). The frame-by-frame advance and the exposure are performed until the last image frame is advanced by repeating the above steps.

When the final image frame has been exposed, the film carrier 106 is positioned at the second position. When the film carrier 106 has been positioned to the second position, the printing lens 118 is displaced so that the image frame is printed/exposed in a proper magnification. When the printing lens 118 has been displaced, the images recorded on the single negative film 208 are displayed on the liquid crystal panel 212 in matrix form so as to be subjected to exposure.

Pre-stored image data are used as data about the images displayed on the liquid crystal panel 212. However, the image data may be successively read and stored by a CCD sensor or the like at the position of the exposure aperture 206 on the film carrier 208 or at positions before and after the exposure aperture 206.

According to the present embodiment, since the liquid crystal panel is used as an alternative to a CRT, the light source that the CRT cannot commonly use, can be shared between the respective components and images excellent in resolution and tone can be printed. Further, an image displaying means can be reduced in size. By simply setting a size corresponding to the distance traveled by the film carrier 106 between the exposure aperture 206 for the negative film 208 and the liquid crystal panel 212 without newly providing an optical system such as a light source or the like, the photographic printer can be reduced in size and the images recorded on the negative film 208 and the images displayed on the liquid crystal panel 212 can be successively printed.

In the present embodiment, when the images recorded on the negative film 208 and the images formed on the liquid crystal panel 212 are exposed by switching, they can be exposed without changing the type of filter 110 in particular. They can be also exposed by either one of an additive color exposure method and a subtractive color exposure method. By simply performing the exchange of the negative film 208 and the liquid crystal panel 212 in the additive color exposure method in particular, sharp images can be exposed in either case. On the other hand, when the subtractive color exposure method is used, the simple subtractive color exposure method is adopted as it is upon exposure of the images on the negative film. It is preferable for sharper printing of the images on the liquid crystal panel that upon exposure of the images on the liquid crystal panel, the action of the filter 110 is changed and visible light is separated into R (Red), G (Green) and B (Blue) light by using respective filters which are cyan (C), magenta (M) and yellow (Y), thereby exposing the images on the liquid crystal panel under the additive color exposure method. According to the above method, it is unnecessary to additionally provide filters dedicated to the additive color exposure method.

The present embodiment shows a method (linear type method) of linearly inserting the exposure aperture 206 or the liquid crystal panel 212 into the printing optical path and separating them therefrom, by using the film carrier 106 in which the exposure aperture 206 and the liquid crystal panel 212 are provided side by side. However, the present embodiment is not limited to this method if a film carrier of type wherein the exposure aperture 206 or the liquid crystal panel 212 can be successively inserted into and separated from the same light source and its optical system and a method of enabling it are used. For example, a method (rotary type method) of using, for example, a disk-shaped film carrier other than the rectangular film carrier, providing an exposure aperture and a liquid crystal panel side by side on the disk-shaped film carrier and successively inserting the exposure aperture 206 or the liquid crystal panel 212 into a printing optical path while rotating it on a working stage on a flat basis, a method (replacement type method) of separately providing a detachable/attachable film carrier having an exposure aperture and a detachable/attachable carrier for a liquid crystal panel and alternately placing these carriers on a working stage, or a method (two-stage type method) of using a two-stage type film carrier formed by detachably and coaxially stacking liquid crystal panels on an exposure aperture, detaching the liquid crystal panels upon exposure of images recorded on a negative file and exposing image frames on the negative film positioned on a printing aperture can be utilized equivalently (see FIG. 6). Thus, the rotary type method eliminates the need of ensuring a spare travel space for switching between the photographic film and the liquid crystal panel. In the replacement type method, the size of a photographic printer remains completely unchanged. In the two-stage type, the thickness of the film carrier is simply increased by the thickness of the liquid crystal panel and the size of a photographic printer itself remains unchanged.

[Second embodiment]

Figure 5:
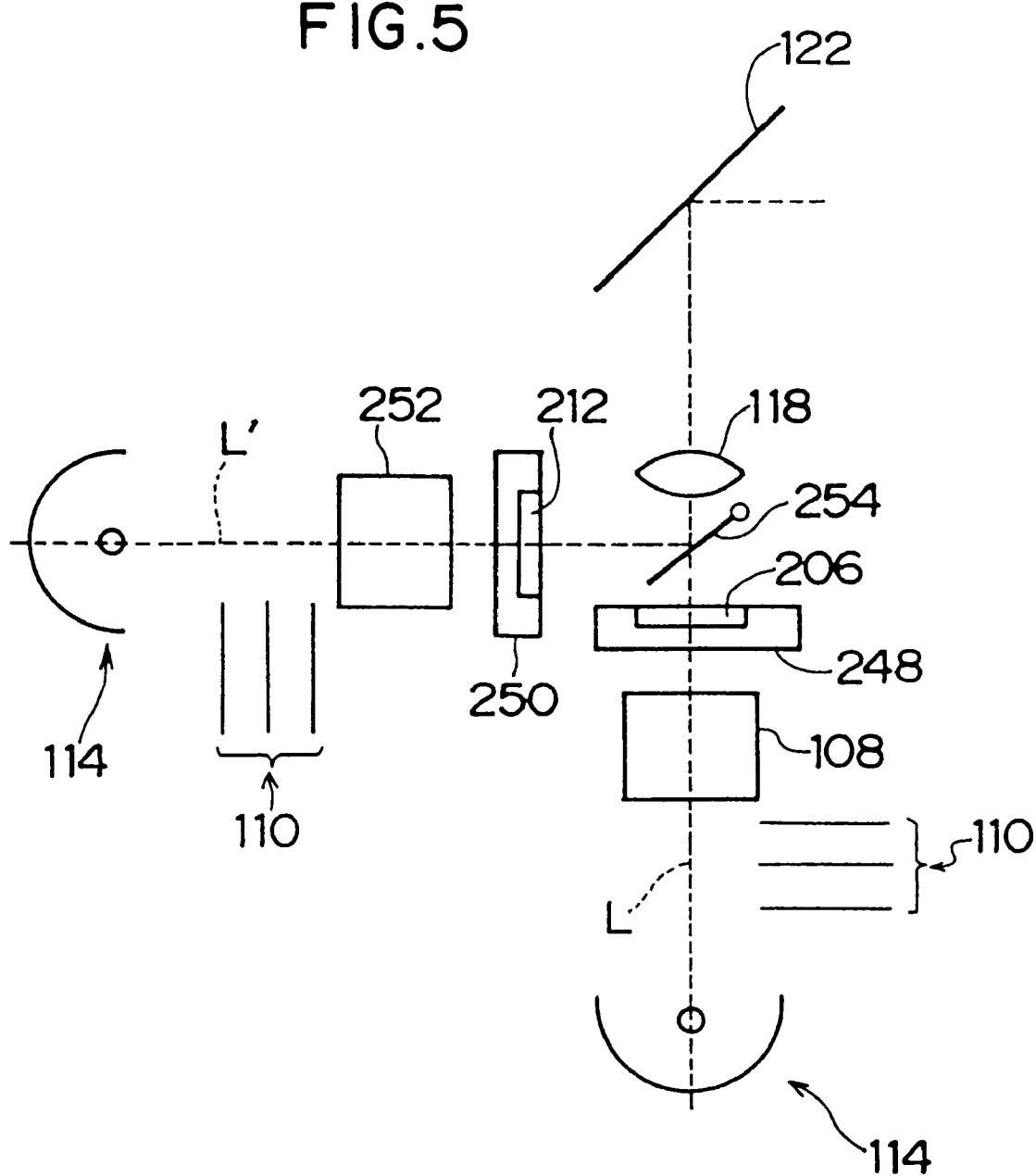
FIG. 5 is a schematic view showing a photographic printer according to a second embodiment of the present invention.

FIG. 5 schematically illustrates another embodiment of the present invention.

A normal film carrier 248 (corresponding to a general film carrier in which the liquid crystal panel 212 is eliminated from the film carrier 106 shown in FIG. 2) having an exposure aperture 208 is disposed in an optical axis L of a printing optical path of a light source 114. On the other hand, a holder 250 for holding a liquid crystal panel 212 therein is disposed in an optical axis L'. A diffusion barrel 252 is provided on the upstream side of the holder 250 and a diffusion coefficient of the diffusion barrel 252 is lower than that of a diffusion barrel 108 disposed in the optical axis L. It is therefore possible to cause light emitted from the light source 114 to enter into an image on the liquid crystal panel 212 in a state relatively approximate to parallel light.

A reflecting mirror 254 is situated in a position where the optical axis L and the optical axis L' intersect.

Thus, when the reflecting mirror 254 is spaced away from the optical axis L, images recorded on a negative film 208 on the film carrier 248 are exposed along the optical axis L. On the other hand, when the reflecting mirror 254 is inserted into the optical axis L, the optical axis L' coincides with the optical axis L so that images displayed on the liquid crystal panel 212 on the holder 250 are subjected to exposure.

The operation of the present embodiment will now be described in accordance with the procedure described in the first embodiment.

The negative film 208 is set onto the film carrier 248 and the film carrier 248 is placed on the optical axis L. A process for exposing the initial image frame on the negative film 208 is started. When the exposure of the initial image frame is completed, the negative film 208 is conveyed to expose the next image frame. The frame-by-frame advance and the exposure are repeated till the final image frame.

When all the image frames stored in the negative film 208 are subjected to exposure, a printing lens 118 is displaced to a proper position. When the printing lens 118 is moved, the images are displayed on the liquid crystal panel 212 on the holder 250. The printing lens 118 may be firstly moved or the images may be firstly displayed on the liquid crystal panel 212. When the images are displayed on the liquid crystal panel 212, the reflecting mirror 254 is inserted into the optical axis L. When the reflecting mirror 254 enters into the optical axis L, the optical axis L' coincides with the optical axis L so that the images displayed on the liquid crystal panel 212 are exposed onto photographic paper.

According to the present embodiment, the photographic printer can be reduced in size and the images recorded on the negative film and the images displayed on the liquid crystal panel can be printed on the photographic paper under the common use of the printing optical path.

Since the light source and the filters or the like can be separately provided, proper exposing systems can be respectively selected to the images recorded on the negative film and the images displayed on the liquid crystal panel. Since the additive color exposure of the images displayed on the liquid crystal panel by use of the R, G and B filters dedicated thereto and the subtractive color exposure of the images recorded on the negative film by use of the C, M and Y filters dedicated thereto can particularly provide a clearer image exposure process as compared with the additive color exposure of the images displayed on the liquid crystal panel by a combination of C, M and Y filters used as R, G and B filters, they are preferable because they can both provide satisfactory images.

In the first and second embodiments, the images displayed on the liquid crystal panel 212 are exposed after all the image frames recorded on the single negative film 208 have been completely exposed. However, the first and second embodiments are not limited to this order. For example, images displayed on a liquid crystal panel 212 may be first printed as in the case where images on a negative film 208 are printed after a title and the like have been displayed on the liquid crystal panel 212 and exposed. Further, they may be printed alternately or by superposition.

According to the present invention, as has been described above, a method of and a device capable of printing images on different mediums, such as images recorded on a normal photographic film and index print images while the device is reduced in size, can be provided.

Having now fully described the invention, it will be apparent to those skilled in the art that many changes and modifications can be made without departing from the spirit or scope of the invention as set forth herein.

What is claimed is:

1. A method of printing images, in which light emitted from a light source is transmitted through a single image placed on a printing optical path so as to print the image onto a photographic paper, comprising:

selectively placing one of an image recorded on a photographic film and a corresponding image which has been recorded on the photographic film and which is displayed on a liquid crystal display panel at a predetermined position on the printing optical path between the light source and the photographic paper for printing the selected image on the photographic paper.

2. A method according to claim 1, wherein exposure conditions are changed upon printing the image recorded on the photographic film and printing the image formed on the liquid crystal panel.

3. A method according to claim 2, wherein an additive color exposure is effected on the image formed on the liquid crystal panel and a subtractive color exposure is effected on the image recorded on the photographic film.

4. A method according to claim 1, wherein an additive color exposure is effected on the image formed on the liquid crystal panel and a subtractive color exposure is effected on the image recorded on the photographic film.

5. A method according to claim 1, wherein an exposure aperture used for the image recorded on the photographic film and the liquid crystal panel are disposed on a linearly movable film carrier and one of the image recorded on the photographic film and the image formed on the liquid crystal panel can be selectively placed at the predetermined position on the printing optical path by moving the film carrier.

6. A method according to claim 1, wherein an exposure aperture used for the image recorded on the photographic film and the liquid crystal panel are disposed on a rotatable film carrier and one of the image recorded on the photographic film and the image formed on the liquid crystal panel can be selectively placed at the predetermined position on the printing optical path by rotating the film carrier.

7. A method according to claim 1, wherein a detachable/attachable film carrier having an exposure aperture used for the image recorded on the photographic film and a detachable/attachable carrier for the liquid crystal panel are individually prepared so that one of the image recorded on the photographic film and the image formed on the liquid crystal panel are capable of being selectively placed in the predetermined position on the printing optical path by alternately placing these carriers on a working stage.

8. The method of printing images according to claim 1, wherein said corresponding image displayed on said liquid crystal display panel, is formed by an image processor being connected to said liquid crystal display panel by a liquid crystal display panel driver, said image processor reading image data of the photographic film, storing the image data therein, and sending the image data to said liquid crystal display panel.

9. A method of printing images, in which light emitted from a light source is transmitted through an image placed on a printing optical path so as to print the image onto a photographic paper, comprising:

selectively placing one of an image recorded on a photographic film and an image formed on a liquid crystal panel at a predetermined position on the printing optical path, wherein a two-stage type film carrier formed by detachably and coaxially stacking the liquid crystal panel on an exposure aperture used for the image recorded on the photographic film is prepared, so that one of the image recorded on the photographic film and the image formed on the liquid crystal panel is capable of being selectively placed in the predetermined position on the printing optical path, by detaching the liquid crystal panel from the exposure aperture prior to exposure of the image recorded on the photographic film, and placing the liquid crystal panel on the exposure aperture prior to exposure of the image formed on the liquid crystal panel.

10. A method of printing images, in which light emitted from a light source is transmitted through images placed on printing optical paths so as to print the images onto a photographic paper, said method comprising the steps of:

transmitting light emitted from a first light source through an image recorded on a photographic film in a first printing optical path;

transmitting light emitted from a second light source through an image formed on a liquid crystal panel in a second printing optical path, wherein the image formed on the liquid crystal display has been recorded on the photographic film; and selectively directing one of the image transmitted through the first printing optical path and the image transmitted through the second printing optical path to the photographic paper by means of a reflecting mirror, thereby printing the images onto the photographic paper, wherein a printing lens is positioned after the reflecting mirror, for receiving the image reflected by the reflecting mirror.

11. A method according to claim 9, wherein exposure conditions are changed upon printing the image recorded on the photographic film and printing the image formed on the liquid crystal panel.

12. A method according to claim 11, wherein an additive color exposure is effected on the image formed on the liquid crystal panel and a subtractive color exposure is effected on the image recorded on the photographic film.

13. A method according to claim 10, wherein an additive color exposure is effected on the image formed on the liquid crystal panel and a subtractive color exposure is effected on the image recorded on the photographic film.

14. The method printing images according to claim 10, wherein said image formed on said liquid crystal display panel is formed by an image processor being connected to said liquid crystal display panel by a liquid crystal display panel driver, said image processor reading image data of the photographic film, storing the image data therein, and sending the image data to said liquid crystal display panel.

15. A method of printing images, in which light emitted from a light source is transmitted through a single image placed on a printing optical path so as to print the image onto a photographic paper, comprising:

selectively placing one of an image recorded on a photographic film and an image formed on a liquid crystal display panel at a predetermined position on the printing optical path for printing the selected image on the photographic paper; and wherein a detachable/attachable film carrier having an exposure aperture used for the image recorded on the photographic film and a detachable/attachable carrier for the liquid crystal panel are individually prepared so that one of the image recorded on the photographic film and the image formed on the liquid crystal panel is capable of being selectively placed in the predetermined position on the printing optical path by alternately placing these carriers on a working stage.

16. A device for printing images in which light emitted from a light source is transmitted through a single image placed on a printing optical path so as to print the image onto a photographic paper, said device comprising:

a film carrier capable of conveying image frames on a photographic film along a film guide path and holding a peripheral portion of each image frame positioned to the position of a mask aperture;

a liquid crystal panel provided in said film carrier and mounted to an aperture provided at a position away from the mask aperture, having an image which has been recorded on the photographic film displayed thereon; and a member for positioning said film carrier to one of a first position where the mask aperture is placed on the printing optical path between the light source and the photographic paper and a second position where said liquid crystal panel is placed on the printing optical path between the light source and the photographic paper, so that the image of one of said photographic film and said liquid crystal panel is printed on the photographic paper.

17. A device according to claim 16, wherein said positioning member includes a slide member for slidably supporting said film carrier linearly with a film carrier support base and positions said film carrier to one of the first and second positions in a sliding range of said slide member.

18. A device according to claim 17, wherein said slide member is a pair of rails.

19. A device according to claim 16, wherein said film carrier is disk-shaped and rotatable.

20. The device for printing images according to claim 16, wherein said image displayed on said liquid crystal display panel is formed by an image processor being connected to said liquid crystal display panel by a liquid crystal display panel driver, said image processor reading image data of the photographic film, storing the image data therein, and sending the image data to said liquid crystal display panel.

21. A device for printing images, in which light emitted from a light source is transmitted through an image placed on a printing optical path so as to print the image onto a photographic paper, said device comprising:

a film carrier capable of conveying image frames on a photographic film alone a film guide path and holding a peripheral portion of each image frame positioned to the position of a mask aperture;

a liquid crystal panel provided in said film carrier and mounted to an aperture provided at a position away from the mask aperture; and a member for positioning said film carrier to one of a first position where the mask aperture is placed on the printing optical path and a second position where said liquid crystal panel is placed on the printing optical path, wherein said positioning member includes a slide member for slidably supporting said film carrier linearly with a film carrier support base and positions said film carrier to one of the first and second positions in a sliding range of said slide member, wherein said slide member includes projections which are provided at both ends thereof corresponding to the first and second positions, thereby allowing said film carrier to be manually positioned to the first or second position.

22. A device for printing images, in which light emitted from a light source is transmitted through an image placed on a printing optical path so as to print the image onto a photographic paper, said device comprising:

a film carrier capable of conveying image frames on a photographic film along a film guide path and holding a peripheral portion of each image frame positioned to the position of a mask aperture;

a liquid crystal panel provided in said film carrier and mounted to an aperture provided at a position away from the mask aperture, having an image formed therein; and a member for positioning said film carrier to one of a first position where the mask aperture is placed on the printing optical path and a second position where said liquid crystal panel is placed on the printing optical path, wherein said positioning member includes a slide member for slidably supporting said film carrier linearly with a film carrier support base and positions said film carrier to one of the first and second positions in a sliding range of said slide member, wherein said positioning member comprises a driver for driving said film carrier along the slide member, at least one sensor for electrically detecting that said film carrier has reached the first and second positions, and a controller for controlling the driving of the driver based on a signal outputted from the sensor.

23. A device according to claim 22, wherein said driver is a motor.

24. A device for printing images, in which light emitted from a light source is transmitted through an image placed on a printing optical path so as to print the image onto a photographic paper, said device comprising:
- a film carrier capable of conveying image frames on a photographic film along a film guide path and holding a peripheral portion of each image frame positioned to the position of a mask aperture;
- a liquid crystal panel provided in said film carrier and mounted to an aperture provided at a Position away from the mask aperture; and
- a member for positioning said film carrier to one of a first position where the mask aperture is placed on the printing optical path and a second position where said liquid crystal panel is placed on the printing optical path, wherein said film carrier is disk-shaped and rotatable, and, wherein said positioning member comprises a driver for rotating said film carrier, at least one sensor for electrically detecting that said film carrier has reached the first and second positions, and a controller for controlling the driving of the driver based on a signal outputted from the sensor.

* * * * *